United States Patent
Wakimoto (10) Patent No.: US 9,631,256 B2
(45) Date of Patent: Apr. 25, 2017

(54) ALKALI METAL AND/OR ALKALI EARTH METAL EXTRACTION METHOD

(71) Applicant: AISIN SEIKI KABUSHIKI KAISHA, Kariya-shi (JP)

(72) Inventor: Yoshiki Wakimoto, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 195 days.

(21) Appl. No.: 14/409,723

(22) PCT Filed: Jul. 4, 2013

(86) PCT No.: PCT/JP2013/068376
§ 371 (c)(1),
(2) Date: Dec. 19, 2014

(87) PCT Pub. No.: WO2014/007331
PCT Pub. Date: Jan. 9, 2014

(65) Prior Publication Data
US 2015/0322547 A1   Nov. 12, 2015

(30) Foreign Application Priority Data

Jul. 5, 2012   (JP) .................................. 2012-151746

(51) Int. Cl.
*C22B 7/00*   (2006.01)
*C22B 26/00*   (2006.01)
(Continued)

(52) U.S. Cl.
CPC .............. *C22B 26/20* (2013.01); *B01D 11/02* (2013.01); *B01D 11/0288* (2013.01);
(Continued)

(58) Field of Classification Search
CPC .......... C22B 7/007; C22B 26/00; C22B 3/165; B01D 11/02
(Continued)

(56) References Cited

U.S. PATENT DOCUMENTS 3,755,158 A * 8/1973 Inazuka ................ C02F 1/5236
                                                       210/725
4,237,147 A * 12/1980 Merten ..................... A23L 2/40
                                                       252/183.16
(Continued)

FOREIGN PATENT DOCUMENTS

CN   101293663 A * 10/2008
CN   101993104 A   3/2011
(Continued)

OTHER PUBLICATIONS

Lidan Zhao et al. CN 101293663 A Published Oct. 2008. Machine Translation.*

(Continued)

*Primary Examiner* — George Wyszomierski
*Assistant Examiner* — Tima M McGuthry Banks
(74) *Attorney, Agent, or Firm* — Oblon, McClelland, Maier & Neustadt, L.L.P.

(57) ABSTRACT

This alkali metal and/or alkali earth metal extraction method is superior in terms of cost and allows repeated use of the aqueous solution that extracts alkali metal and/or alkali earth metal from a solid. This method is for extracting alkali metal and/or alkali earth metal from a solid containing an alkali metal and/or alkali earth metal, and involves an elution step in which the solid is added to an amino acid-containing aqueous solution, and the alkali metal and/or alkali earth metal is eluted into the amino acid-containing aqueous solution.

17 Claims, 7 Drawing Sheets

(51) Int. Cl.
*C22B 3/16* (2006.01)
*B01D 11/02* (2006.01)
*C22B 26/20* (2006.01)
*C01F 11/18* (2006.01)
*B09B 3/00* (2006.01)
*C01F 5/24* (2006.01)

(52) U.S. Cl.
CPC .............. *B09B 3/0016* (2013.01); *C01F 5/24* (2013.01); *C01F 11/18* (2013.01); *C22B 3/165* (2013.01); *C22B 7/007* (2013.01); *C22B 26/00* (2013.01)

(58) Field of Classification Search
USPC ......................................... 423/158, 184, 202
See application file for complete search history.

(56) References Cited

U.S. PATENT DOCUMENTS

| | | | |
|---|---|---|---|
| 4,760,138 A | * | 7/1988 | So .............................. A23L 2/40 423/158 |
| 2006/0128799 A1 | | 6/2006 | Park |
| 2010/0093850 A1 | | 4/2010 | Park |

FOREIGN PATENT DOCUMENTS

| | | | |
|---|---|---|---|
| JP | 57-042532 A | | 3/1982 |
| JP | 62-001832 A | | 1/1987 |
| JP | 1-317531 A | | 12/1989 |
| JP | 10-072215 A | | 3/1998 |
| JP | 2001-121188 A | | 5/2001 |
| JP | 2003-27153 A | | 1/2003 |
| JP | 2003-159583 A | | 6/2003 |
| JP | 2005-097072 A | | 4/2005 |
| JP | 2005-219013 A | | 8/2005 |
| JP | 2006-069860 A | | 3/2006 |
| JP | 2006-509787 A | | 3/2006 |
| JP | 2007-056308 A | | 3/2007 |
| JP | 2007-222713 A | | 9/2007 |
| JP | 2007-314359 A | | 12/2007 |
| JP | 2009-136770 A | | 6/2009 |
| JP | 2011-212534 A | | 10/2011 |
| WO | WO 00/03949 A1 | | 1/2000 |
| WO | WO 0003949 A1 | * | 1/2000 |
| WO | WO 2011/040231 A1 | | 4/2011 |

OTHER PUBLICATIONS

Notice of Reasons for Rejection issued May 31, 2016 in Japanese Patent Application No. 2014-523786 (with English language translation).
English translation of the International Preliminary Report on Patentability and Written Opinion issued Jan. 15, 2015 in PCT/JP2013/068376.
International Search Report issued Sep. 17, 2013 in PCT/JP2013/068376 filed Jul. 4, 2013.
Search Report issued Jun. 17, 2015 in European Patent Application No. 13813295.6.

* cited by examiner

| various amino acids | solid matter | molar ratio | solid matter weight(g) | amino acid weight(g) |
|---|---|---|---|---|
| L-arginine | cement | 1:0.1 | 2.402 | 0.480 |
| | | 1:1 | 2.403 | 4.787 |
| | slag | 1:0.1 | 3.661 | 0.479 |
| | | 1:1 | 3.661 | 4.787 |
| L-aspartic acid | cement | 1:0.1 | 2.403 | 0.365 |
| | | 1:1 | 2.402 | 3.659 |
| | slag | 1:0.1 | 3.662 | 0.367 |
| | | 1:1 | 3.661 | 3.659 |
| L-glutamine | cement | 1:0.1 | 2.400 | 0.403 |
| | | 1:1 | 2.402 | 4.043 |
| | slag | 1:0.1 | 3.660 | 0.404 |
| | | 1:1 | 3.661 | 4.044 |
| L-proline | cement | 1:0.1 | 2.401 | 0.315 |
| | | 1:1 | 2.401 | 3.164 |
| | slag | 1:0.1 | 3.660 | 0.317 |
| | | 1:1 | 3.661 | 3.164 |
| L-alanine | cement | 1:0.1 | 2.401 | 0.246 |
| | | 1:1 | 2.400 | 2.449 |
| | slag | 1:0.1 | 3.659 | 0.244 |
| | | 1:1 | 3.661 | 2.448 |
| L-cysteine | cement | 1:0.1 | 2.400 | 0.334 |
| | | 1:1 | 2.400 | 3.329 |
| | slag | 1:0.1 | 3.661 | 0.333 |
| | | 1:1 | 3.661 | 3.330 |
| L-isoleucine | cement | 1:0.1 | 2.400 | 0.362 |
| | | 1:1 | 2.401 | 3.605 |
| | slag | 1:0.1 | 3.661 | 0.361 |
| | | 1:1 | 3.661 | 3.605 |
| N-acetyl-DL-tryptophan | cement | 1:0.1 | 2.400 | 0.667 |
| | | 1:1 | 2.402 | 6.767 |
| | slag | 1:0.1 | 3.661 | 0.677 |
| | | 1:1 | 3.661 | 6.768 |
| DL-alanine | cement | 1:0.1 | 2.400 | 0.245 |
| | | 1:1 | 2.401 | 2.449 |
| | slag | 1:0.1 | 3.661 | 0.244 |
| | | 1:1 | 3.660 | 2.449 |

ALKALI METAL AND/OR ALKALI EARTH METAL EXTRACTION METHOD

TECHNICAL FIELD

The present invention relates to a method for extracting alkali metal and/or alkali earth metal from a solid containing the alkali metal and/or the alkali earth metal.

BACKGROUND ART

As a conventional method for extracting alkali metal and/or alkali earth metal from a solid containing the alkali metal and/or alkali earth metal, there is known e.g. a method disclosed in Patent Document 1 identified below. Patent Document 1 discloses a method for extracting magnesium and calcium from iron steel slag or the like, in which method the steel slag or the like is added to an aqueous solution containing formic acid or citric acid to allow elution of magnesium and calcium therein; then, carbon dioxide gas is infused into the aqueous solution to allow precipitation thereof as carbonates (magnesium carbonate and calcium carbonate).

CITATION LIST

Patent Literature

Patent Document 1: Japanese Unexamined Patent Application Publication No. 2007-222713 (see claims).

SUMMARY OF INVENTION

Technical Problem

However, in the case of the aqueous solution containing formic acid or citric acid disclosed in Patent Document 1, with repetition of dissolution of magnesium and calcium and infusion of carbon dioxide gas, there occurs significant reduction in the ability to extract magnesium and calcium. Therefore, the above aqueous solution cannot be used in repetition, so that there is a problem of cost increase.

The object of the present invention is to provide a method of extracting alkali metal and/or alkali earth metal from a solid, which method is advantageous in the respect of cost since the method allows repeated use of an aqueous solution for extracting the alkali metal and/or the alkali earth metal from the solid.

Solution to Problem

The present inventors discovered that when an amino acid-containing aqueous solution is employed in extracting alkali metal and/or alkali earth metal from a solid, its extraction ability is hardly reduced even after its repeated use and arrived at the present invention based on this discovery.

According to a characterizing feature of a method for extracting alkali metal and/or alkali earth metal from a solid relating to the present invention, the method comprises an elution step of adding the solid to an amino acid-containing aqueous solution to cause the alkali metal and/or the alkali earth metal to be eluted in the amino acid-containing aqueous solution.

With the above-described configuration, the amino acid-containing aqueous solution provides a high extraction ability for the alkali metal and/or the alkali earth metal in the solid mater and this high extraction ability is maintained even after repeated use. Thus, the amino acid-containing aqueous solution can be used in repetition and cost reduction is made possible.

According to a further characterizing feature, the method further comprises a precipitating step of causing the amino acid-containing aqueous solution after the elution step to come into contact with an acid gas to cause the alkali metal and/or the alkali earth metal to be precipitated as a salt; and a collecting step of collecting the salt.

With the above-described configuration, through a simple operation of causing the solution to contact an acid gas, the alkali metal and/or the alkali earth metal eluted in the elution step can be collected as a salt(s) in an efficient manner.

According to a still further characterizing feature, the precipitating step includes a pH adjusting step of adding a pH adjusting agent to the amino acid-containing aqueous solution before or after its contact with the acid gas to increase its pH value to 7 or more.

For instance, in case an amino acid-containing aqueous solution containing an acidic amino acid such as aspartic acid is employed, this amino acid-containing aqueous solution may have an acidic pH value after the elution step.

In such case as above, even when the acid gas is contacted with the acidic amino acid-containing aqueous solution to react with the alkali metal and/or the alkali earth metal, precipitation of the salt becomes difficult.

Then, if the pH value of the amino acid-containing aqueous solution is increased to 7 or more to acquire an alkaline property before/after its contact with the acid gas, precipitation of the salt is promoted, so that the efficiency is improved.

According to a still further characterizing feature, the method further comprises a second elution step of adding a further solid containing the alkali metal and/or the alkali earth metal to the amino acid-containing aqueous solution after the collecting step to cause the alkali metal and/or the alkali earth metal to be eluted in the amino acid-containing aqueous solution.

With the above configuration, it becomes also possible to reuse the amino acid-containing aqueous solution once used to implement an eluting method of eluting the alkali metal and/or the alkali earth metal from the further solid. Thus, the convenience is improved.

According to a still further characterizing feature, the amino acid comprises aspartic acid.

With the above configuration, since an aspartic acid containing aqueous solution has a high elution ability and this ability can be maintained stably even after relatively many times of repeated use, further cost reduction is made possible.

DESCRIPTION OF EMBODIMENTS

Embodiment

Next, an embodiment of the present invention will be explained. An inventive method for extracting alkali metal and/or alkali earth metal from a solid includes an elution step of adding the solid to an amino acid-containing aqueous solution to cause the alkali metal and/or the alkali earth metal to be eluted in the amino acid-containing aqueous solution.

(Solid)

The "solid" in the context of the present invention is at least one selected from the group consisting of alkali metals such as lithium, sodium, potassium, rubidium, cesium, etc. and alkali earth metals such as magnesium, calcium, strontium, barium, radium, etc. Some non-limiting examples thereof include natural minerals, wastes, byproducts generated in a manufacturing method, and so on.

As some non-limiting examples of the natural minerals, there can be cited respective simple substances, hydrates or the like of carbonate, phosphate, silicate, aluminate, sulfate, hydroxide, chloride of the alkali metals, as well as respective simple substances, hydrates or the like of carbonate, phosphate, silicate, aluminate, sulfate, hydroxide, chloride of the alkali earth metals. As more specific examples of the natural mineral substances, there can be cited rockstones and rocks and weathered or ground matters thereof containing as a principal component thereof at least one selected from the group consisting of calcium silicate, sodium silicate, sodium phosphate, magnesium silicate, calcium phosphate, magnesium phosphate, calcium aluminate, magnesium aluminate, etc.

Further, as some non-limiting examples of the wastes or the byproducts produced and discharged from a manufacturing method, there can be cited concrete material solidified by cement hydrate, construction wastes containing such concrete material or ground substance thereof, steel slag byproducts discharged from a steel making method, cupola slag, soda-lime glass, potash-lime glass, fly ash, or molten slag thereof, paper sludge generated form a paper making method, urban wastes or waste sludge, etc.

As the solid for use in the present invention, if a matter ground to a particle size of approximately 1 μm to 100 μm is employed, such matter will facilitate elution of the alkali metal and/or the alkali earth metal advantageously.

(Amino Acid-Containing Aqueous Solution)

An "amino acid-containing aqueous solution" in the context of the present invention refers to an aqueous solution containing at least a predetermined amount of an amino acid. However, in addition to the amino acid, the solution can contain a carboxylic acid such as citric acid.

Also, an "amino acid" in the context of the present invention refers to organic compounds in general having functional groups of both an amino group and a carboxylic group. As principal amino acids for general use, there can be cited the 20 kinds of amino acids making up the proteins of living bodies (isoleucine, leucine, valine, lysine, thereonine, tryptophan, methionine, phenylalanine, histidine, arginine, aspartic acid, asparagine, cysteine, tyrosine, alanine, glucosamine, glutamic acid, glycine, proline, serine). Further, as an amino acid particularly suitable for realizing stable repeated use of the amino acid-containing aqueous solution by a greater amount, aspartic acid can be cited. The amino acid is not limited to the above-cited amino acids. Instead, an N-protected amino acid such as N-acetyl-DL-tryptophan, or a C-protected amino acid can also be used.

The amount of amino acid to be contained in the amino acid-containing aqueous solution depends on an amount of the solid to be added to this amino acid-containing aqueous solution. The amount can be adjusted as desired or needed by a worker. But, it is proposed that an amount of 0.01 times or more of the total number of moles of the alkali metal and the alkali earth metal contained in the solid can be suitably used, for example.

In the elution step, the amino acid is added to an amount of water to prepare an amino acid-containing aqueous solution and then a solid containing the alkali metal and/or the alkali earth metal is/are added thereto. Thereafter, the mixture will be kept still or can be stirred/mixed with using a known stirring device for allowing elution of the alkali metal and/or the alkali earth metal in the amino acid-containing aqueous solution. Incidentally, regarding various conditions (the amount of the amino acid-containing aqueous solution used, the period of keeping the mixture still, the stirring rate of the stirring device, the temperature and the period for the stirring, etc.) for use in the elution step, these can be suitably selected for use by the worker. But, for example, if the elution step is implemented with using a stirring device on 2 to 4 g of the solid, preferred conditions are about 0.01 L of the amino acid-containing aqueous solution used, about 300 rpm to 500 rpm as the stirring rate of the stirring device, 10° C. to 70° C. as the temperature for stirring, and 0.5 minute or more as the stirring period.

Further, in the present invention, the method can additionally include a precipitating step of causing the amino acid-containing aqueous solution after the elution step to come into contact with an acid gas to cause the alkali metal and/or the alkali earth metal to be precipitated as a salt(s) and a collecting step of collecting the salt(s).

Further, in the present invention, for the sake of even more efficient salt precipitation in the precipitating step, the precipitating step can include a pH adjusting step in which before or after the contact with the acid gas, a pH adjusting agent is added to the amino acid-containing aqueous solution to increase its pH value to 7 or more. The pH adjusting agent for use in this step is not particularly limited, but this agent can suitably be sodium hydrate (NaOH), potassium hydrate (KOH), etc. for example.

(Acid Gas)

As some non-limiting examples of the acid gas suitably used in the present invention, $CO_2$, NOx, SOx, hydrogen sulfide, etc. can be cited. $CO_2$ (carbon dioxide gas), in particular, can be any gas containing carbon dioxide gas, not being limited to pure carbon dioxide gas. For instance, as a carbon dioxide gas, a combustion emission gas generated through combustion of a gaseous fuel such as liquefied natural gas (LNG), liquefied petroleum gas (LP), a liquefied fuel such as gasoline, light oil, solid fuel such as coal, can be used.

A method of causing the acid gas to come into contact with the amino acid-containing aqueous solution can be any known method and is not particularly limited. As some non-limiting examples, a method of bubbling (infusing) acid gas into the amino acid-containing aqueous solution, a method of charging and sealing the amino acid-containing aqueous solution and the acid gas in a same vessel and shaking them together therein, can be cited. Further, in case a combustion emission gas or the like is employed as the acid gas, dust or the like can be eliminated by filtering the gas through an adsorption filter or the like before it is brought into contact with the amino acid-containing aqueous solution. Incidentally, the precipitating step can be implemented at any desired temperature. However, a temperature of 70° C. or lower should be employed since the higher the temperature, the more difficult for the acid gas to be dissolved.

If e.g. carbon dioxide gas is employed in the elution step, a reaction occurs between carbon dioxide and calcium ions or magnesium ions of e.g. alkali earth metal diluted from the solid, whereby a carbonate such as calcium carbonate, magnesium carbonate, or the like will be generated and precipitated.

The salt precipitated in the precipitating step can be collected in the subsequent collecting step, by any known technique such as filtration. The collected salt can be used as a filler in such industries as paper making, pigment, paint, plastics, rubber, fabric, etc.

Further, in the present invention, the method can additionally include a second elution step of adding a further solid containing the alkali metal and/or the alkali earth metal to the amino acid-containing aqueous solution after the collecting step to cause the alkali metal and/or the alkali earth metal be eluted in the amino acid-containing aqueous solution. In succession, a second elution step, a second precipitating step and a second collecting step can be carried out. That is, in the present invention, the second elution, precipitating and collecting steps are effected with using the amino acid-containing aqueous solution used in the first elution step; and then, a series of third steps of elution, precipitating, collecting, a series of fourth steps of elution, precipitating, collecting, and so on can be carried out if desired. In this way, the series of steps of elution, precipitating, collecting can be effected in repetition on a same amino acid-containing aqueous solution. In doing this, the solid to be added to the amino-acid aqueous solution can be the same kind as used in the foregoing elution step or can be a different kind, thus the solid being not particularly limited.

EXAMPLES

Next, the present invention will be explained in greater details with reference to examples thereof. It is understood, however, that the present invention is not limited thereto.

Example 1

Figure 1:
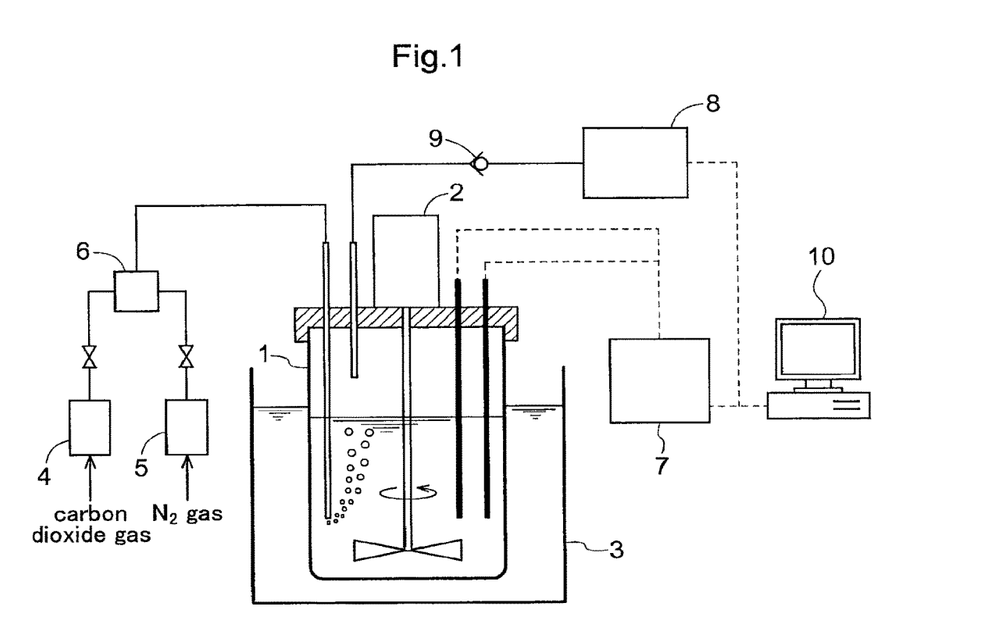
FIG. 1 is a schematic view of an apparatus used in examples.

In order to confirm the ability to extract an alkali metal and/or alkali earth metal from a solid with an amino acid-containing aqueous solution, an elution step relating to the present invention was carried out with using an apparatus shown in FIG. 1. As shown in FIG. 1, this apparatus includes a reactor vessel 1, a stirrer 2, a water bath tank 3 for adjusting a temperature of solution present in the reactor vessel 1, flow rate adjusters 4, 5, a mixer 6, a measuring instrument 7, a gas chromatograph 8, a backflow preventer 9, and a computer 10.

Figure 2:
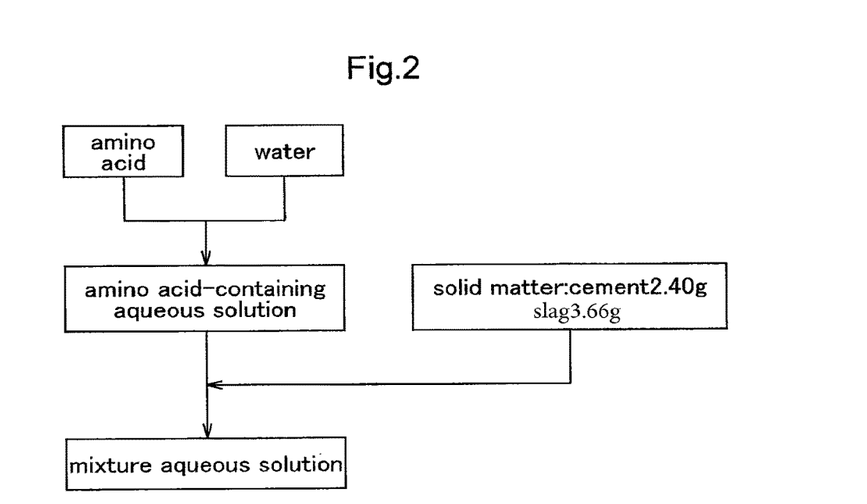
FIG. 2 is a flow diagram relating to Example 1.

In accordance with a flow shown in FIG. 2, an amino acid-containing aqueous solution (100 mL) containing nine kinds of amino acids was prepared and to this, as solids, cement (Portland cement for chemical analysis, Cement Association of Japan, 211R Reference Sample for chemical analysis) 2.40 g or slag (blast furnace slag reference substance, The Japan Iron and Steel Federation, Standarization Center, Certified Reference Slag No. 6) 3.66 g was added to prepare mixture aqueous solution. Incidentally, the amounts of calcium contained in the above-described cement and slag were 64.2 wt % and 42 wt % in terms of conversion to CaO.

Figure 3:
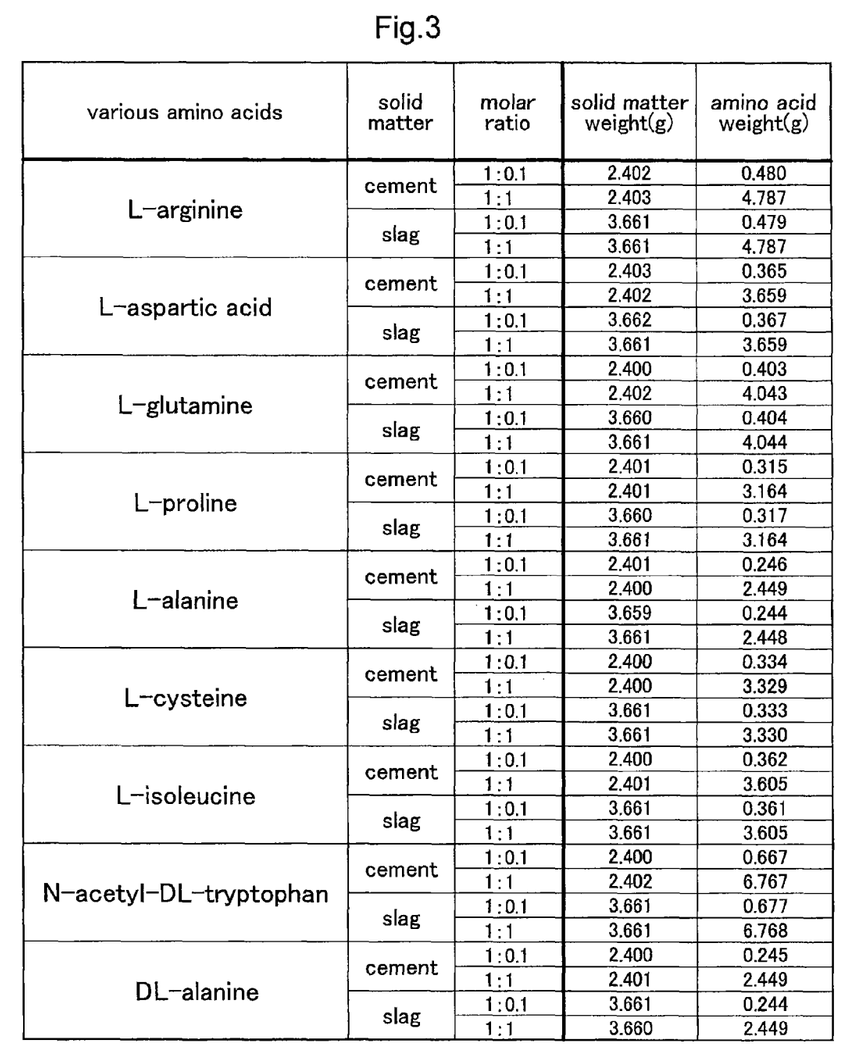
FIG. 3 is a table showing amounts of various kinds of amino acids, cement and slag used in Example 1.

The weights of the nine kinds of amino acid added, the kinds and weights of the solids, and the mole ratios (the substance amount (mol) of CaO in the solid:substance amount of added amino acid (mol)) are shown in FIG. 3. Further, the substance amount (mol) of each kind of amino acid was set to 1 or 0.1 when the substance amount (mol) of CaO contained in the cement and the slag respectively was set to 1. Namely, in this example, 36 (thirty-six) kinds of mixture aqueous solutions were prepared, according to the differences of the kinds of the amino acids added, the kinds of the solids, and the molar ratios.

100 mL of each amino acid-containing aqueous solution was charged into the reactor vessel 1 and then, a predetermined amount of solid was charged therein to prepare mixture aqueous solution. Then, as this solution was subjected to stirring at 400 rpm for 10 minutes with using the stirrer 2 to elute calcium ions therein (elution step). During this elution step, a pH value, an oxidation-reduction potential and a temperature of the mixture aqueous solution held inside the reactor vessel 1 were measured by the measuring instrument 7, thereby to study the pH value and the calcium ion elution ratio (substance amount (mol) of CaO in the mixture aqueous solution/substance amount (mol) of CaO in the solid (cement or slag)×100(%)) of the respective mixture aqueous solution.

FIGS. 4 through 7 show relationship between pH values and calcium ion elution ratios immediately after charging of the solid. FIGS. 8 through 11 show relationship between pH values and calcium ion elution ratios at lapse of 10 minutes after the solid charging.

Figure 4:
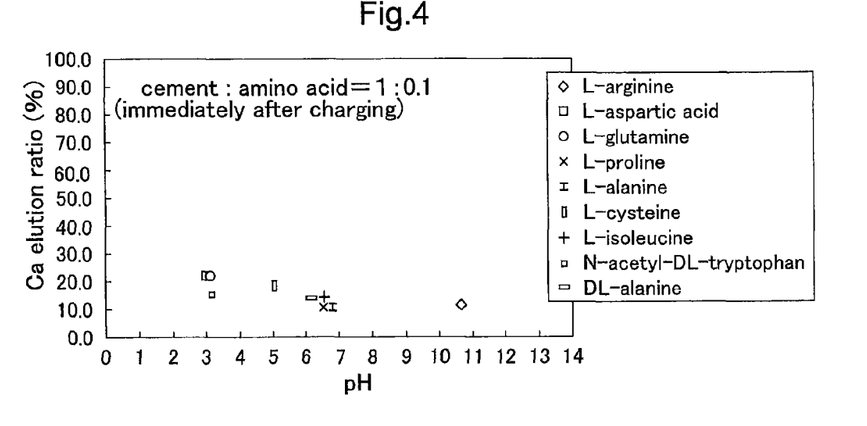
FIG. 4 is a graph showing relationship between pH values of mixture aqueous solution immediately after charging of solid thereto and elution ratios of calcium ion (substance amount (mol) of CaO in cement:substance amount of added various amino acids (mol)=1:0.1)
Figure 8:
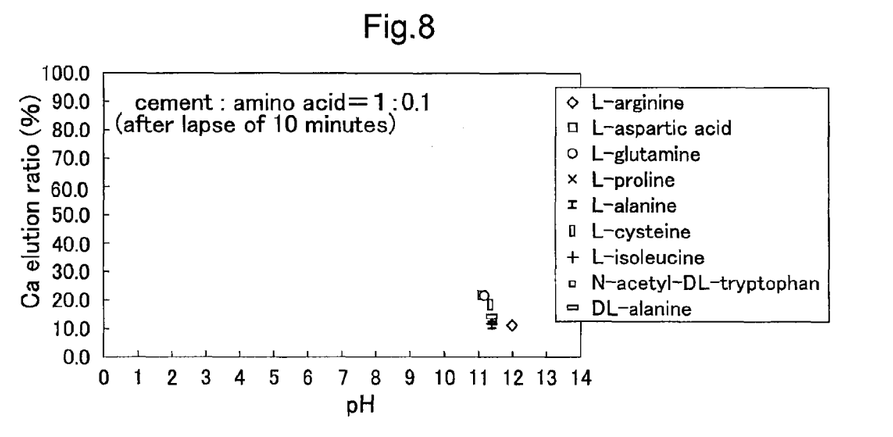
FIG. 8 is a graph showing relationship between pH values of mixture aqueous solution at lapse of 10 minutes after charging of solid thereto and elution ratios of calcium ion (substance amount (mol) of CaO in cement:substance amount of added various amino acids (mol)=1:0.1)

As shown in FIG. 4, pH values of the respective mixture aqueous solutions (molar ratio=1:0.1) immediately after charging of cement ranged widely from 3 to 11 approximately. Whereas, as shown in FIG. 8, after the lapse of 10 minutes, the pH values of the respective mixture aqueous solutions ranged from 11 to 12 approximately, being biased toward the alkaline side.

Figure 5:
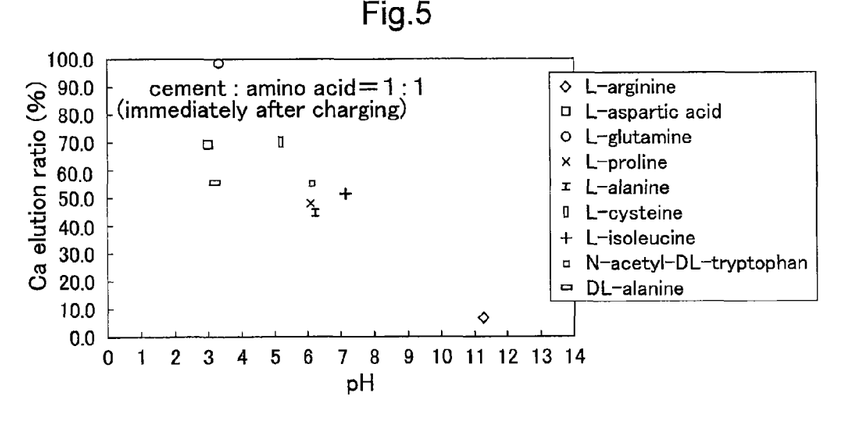
FIG. 5 is a graph showing relationship between pH values of mixture aqueous solution immediately after charging of solid thereto and elution ratios of calcium ion (substance amount (mol) of CaO in cement:substance amount of added various amino acids (mol)=1:1)
Figure 9:
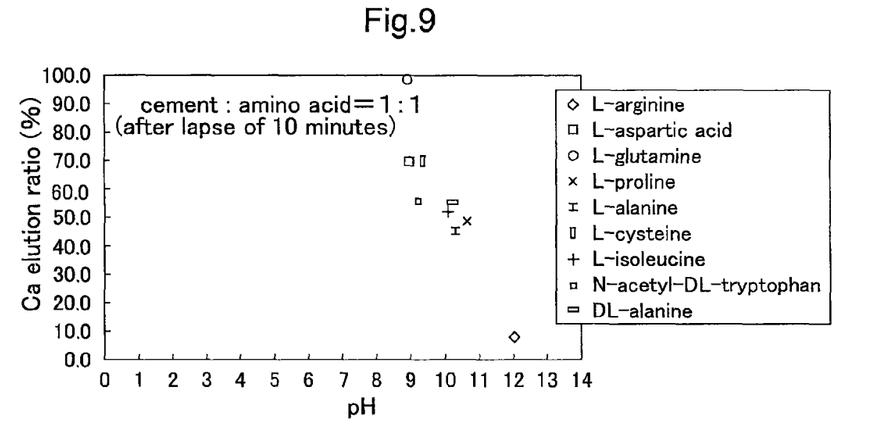
FIG. 9 is a graph showing relationship between pH values of mixture aqueous solution at lapse of 10 minutes after charging of solid thereto and elution ratios of calcium ion (substance amount (mol) of CaO in cement:substance amount of added various amino acids (mol)=1:1)

As shown in FIG. 5, pH values of the respective mixture aqueous solutions (molar ratio=1:1) immediately after charging of cement ranged widely from 3 to 11 approximately. Whereas, as shown in FIG. 9, after the lapse of 10 minutes, the pH values of the respective mixture aqueous solutions ranged from 9 to 12 approximately, being biased toward the alkaline side.

Figure 6:
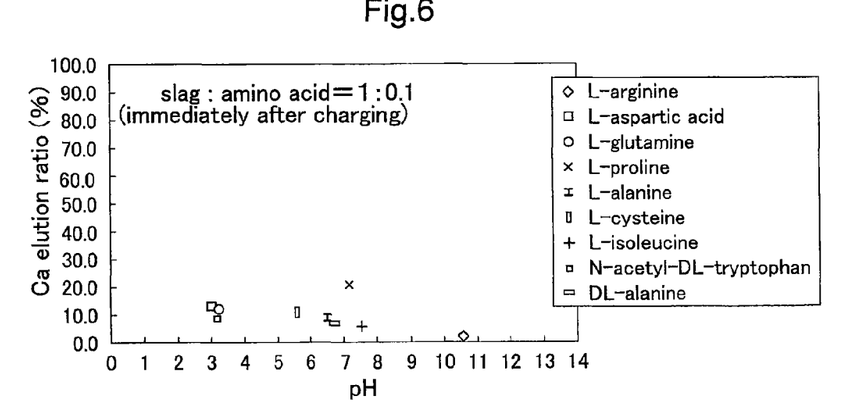
FIG. 6 is a graph showing relationship between pH values of mixture aqueous solution immediately after charging of solid thereto and elution ratios of calcium ion (substance amount (mol) of CaO in slag:substance amount of added various amino acids (mol)=1:0.1)
Figure 10:
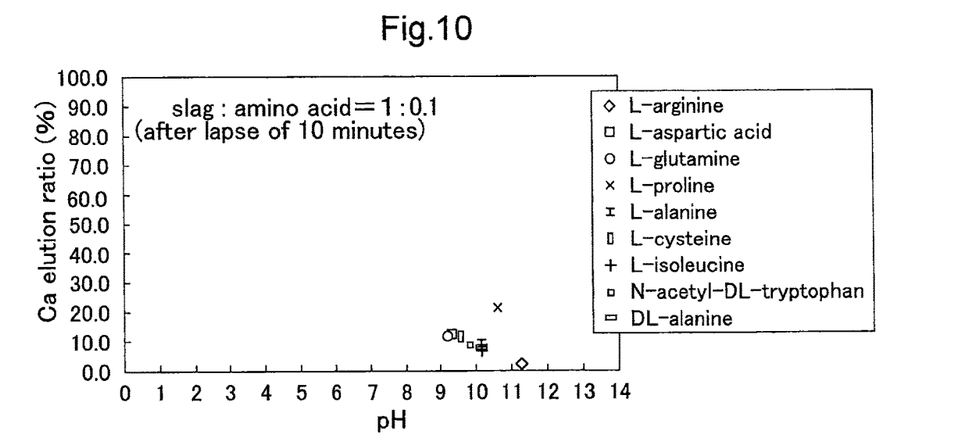
FIG. 10 is a graph showing relationship between pH values of mixture aqueous solution at lapse of 10 minutes after charging of solid thereto and elution ratios of calcium ion (substance amount (mol) of CaO in slag:substance amount of added various amino acids (mol)=1:0.1)

As shown in FIG. 6, pH values of the respective mixture aqueous solutions (molar ratio=1:0.1) immediately after charging of slag ranged widely from 3 to 11 approximately. Whereas, as shown in FIG. 10, after the lapse of 10 minutes, the pH values of the respective mixture aqueous solutions ranged from 9 to 11 approximately, being biased toward the alkaline side.

Figure 7:
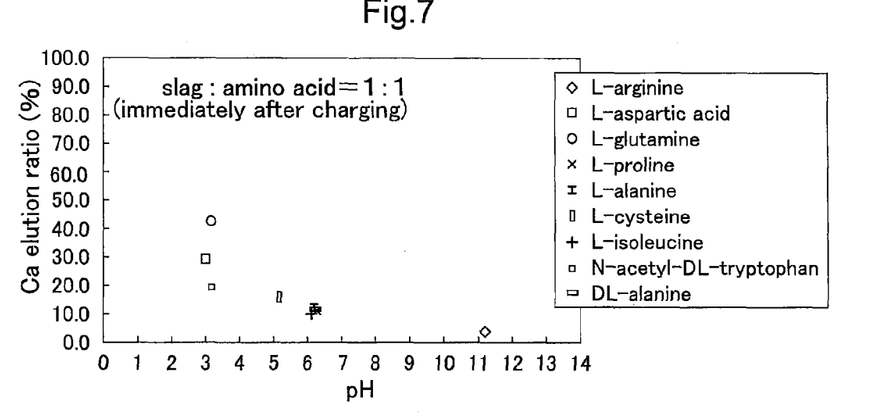
FIG. 7 is a graph showing relationship between pH values of mixture aqueous solution immediately after charging of solid thereto and elution ratios of calcium ion (substance amount (mol) of CaO in slag:substance amount of added various amino acids (mol)=1:1)
Figure 11:
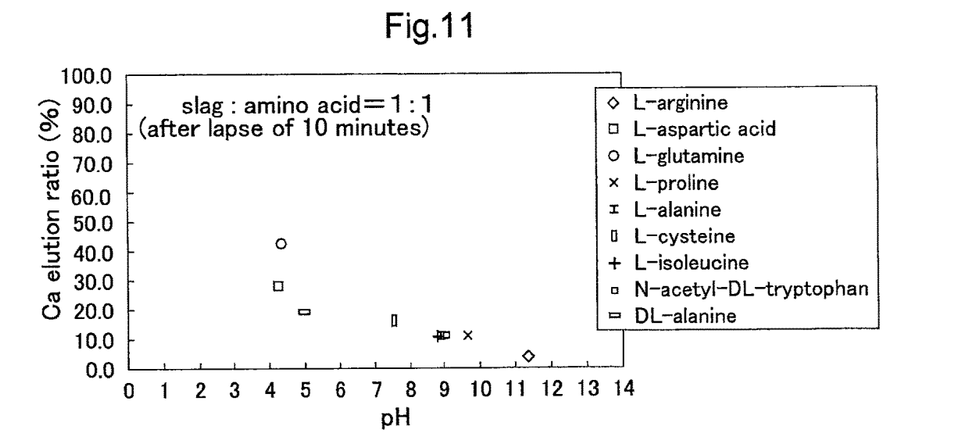
FIG. 11 is a graph showing relationship between pH values of mixture aqueous solution at lapse of 10 minutes after charging of solid thereto and elution ratios of calcium ion (substance amount (mol) of CaO in slag:substance amount of added various amino acids (mol)=1:1)

As shown in FIG. 7, pH values of the respective mixture aqueous solutions (molar ratio=1:1) immediately after charging of slag ranged widely from 3 to 11 approximately. Whereas, as shown in FIG. 11, after the lapse of 10 minutes, the pH values of the respective mixture aqueous solutions ranged from 4 to 11 approximately, being slightly biased toward the alkaline side.

Based on the above, it was found that with all the mixture aqueous solutions, the pH values thereof had wide ranges from the acidity to the alkaline immediately after charging of the solid, but with lapse of time, the pH values tend to be shifted toward the alkaline side.

Referring in greater details to the above tendency, the pH value of the mixture aqueous solution immediately after charging of the solid to the amino acid-containing aqueous solution is determined by the equivalent point (pH) of each kind of amino acid. Therefore, the pH value of a mixture aqueous solution containing an acidic amino acid (L-glutamic acid, L-aspartic acid, etc.) is on the acid side; whereas, the pH value of a mixture aqueous solution containing an alkaline acid (L-alginic acid, etc.) is on the alkaline side. As a result, the pH value of the mixture aqueous solution ranges widely as a whole in correspondence with the kinds of the amino acids contained therein. However, after time lapse, CaO in the solid elutes into the mixture aqueous solution to become $Ca(OH)_2$. Then, with dissociation of this $Ca(OH)_2$, hydroxide ions ($OH^-$) increase, thus rendering pH higher. As a result, the pH of the mixture aqueous solution is shifted toward the alkaline side. The above is the possible, but non-limiting, explanation to the above-described tendency.

Accordingly, based on these results, it was confirmed that with use of an amino acid-containing aqueous solution, an alkali metal and/or an alkali earth metal can be extracted from a solid.

Incidentally, the pH of mixture aqueous solution at lapse of 10 minutes after solid charging is determined by the neutralization point (pH) of calcium ion eluted from the solid and the equivalent point (pH) of each kind of amino acid. That is, in the respective mixture aqueous solutions shown in FIGS. 8 through 10, the substance amount (mol) of eluted calcium ions becomes greater than the substance amount (mol) of each kind of amino acid, so that the pH value is determined mainly by the neutralization point (pH) of calcium ions. Because of this, it is believed that all of the mixture aqueous solutions had alkaline property, thus providing the narrow pH ranges. On the other hand, in the respective mixture aqueous solutions shown in FIG. 11, the substance amount (mol) of each kind of amino acid was substantially equal to or greater than the substance amount (mol) of eluted calcium ions, so the pH were determined mainly by the equivalent points of the respective kinds of amino acids, thus resulting in the wide pH ranges. The above is the possible, but non-limiting, explanation to the above-described tendency.

Further, as shown in FIG. 8 and FIG. 9, there is a tendency of the higher the concentration of amino acid in the mixture aqueous solution, the higher the calcium ion elution ratio. Further, as shown in FIG. 10 and FIG. 11, this tendency of the higher the concentration of amino acid in the mixture aqueous solution, the higher the calcium ion elution ratio applies also to the case using slag as the solid. That is, it may be understood that the Ca elution ratio for a same kind of solid is in direct proportion to the amino acid concentration.

Further, as shown in FIG. 4 and FIG. 8, in the case of using cement as the solid, pH ranged from about 3 to 11 immediately after the charging of cement and after lapse of 10 minutes, the pH ranged from about 11 to 12. On the other hand, in the case of using slag as the solid, pH ranged from about 3 to 11 immediately after the charging of slag and after lapse of 10 minutes, the pH ranged from about 9 to 11. That is, for a same concentration of amino acid in the mixture aqueous solution, the change of pH from the timing of immediately after charging to the timing of lapse of 10 minutes is greater in the case of charging cement.

The driving force of matter movement varies in direct proportion to the concentration of this matter and the driving force of calcium movement ($F=-grad\ \mu_{Ca}$) varies in direct proportion to the calcium concentration. Namely, the greater the amount of calcium contained in the solid (the higher the initial CaO content in the solid in this example), the greater the difference from the initial calcium concentration in the mixture aqueous solution, thus, the greater the driving force involved in calcium movement.

As the calcium content of cement is higher than the calcium content of slag, a greater driving force acts for the calcium movement. Consequently, calcium can elute more easily with cement than with slag, so the pH of the mixture aqueous solutions charged with cement shifted more toward the alkaline side, thus providing greater pH changes. The above is the possible, but non-limiting, explanation.

Further, as shown in FIG. 9, it was also found that of the nine kinds of amino acids employed in this example, acidic amino acids such as L-glutamic acid, L-aspartic acid, etc. had higher elution abilities.

Example 2

In order to confirm whether the alkali metal/alkali earth metal extraction ability of an amino acid-containing aqueous solution is maintained or not, after repeated uses of this amino acid-containing aqueous solution, the series of method according to the invention, including the elution step, the precipitating step and the collecting step was carried out in repetition with using the apparatus shown in FIG. 1 and the elution ratio and precipitation ratio in each method were investigated.

Figure 12:
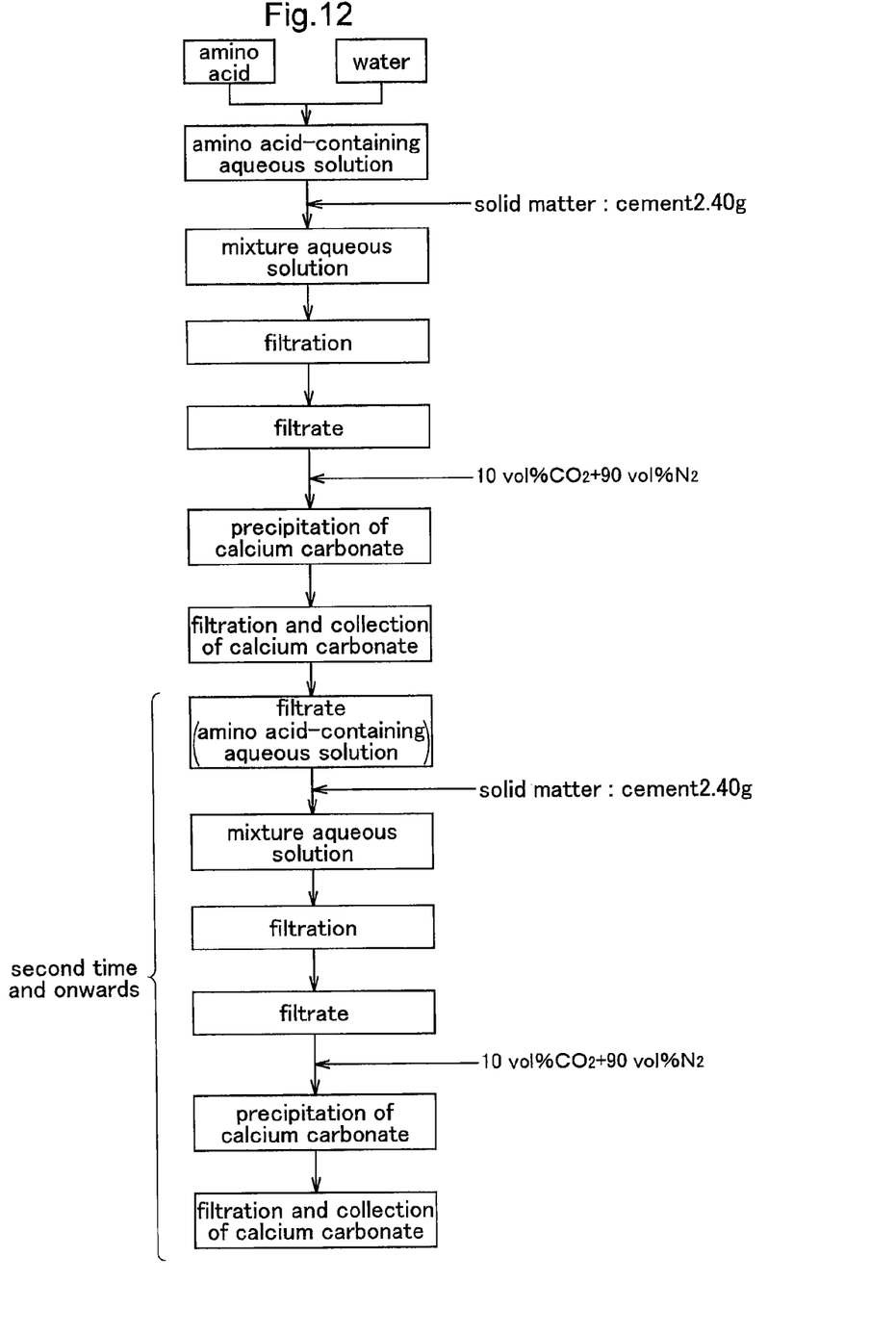
FIG. 12 is a flow diagram relating to Example 2.

In accordance with a flow shown in FIG. 12, an amino acid-containing aqueous solution (100 mL) containing 2.40 g of L-aspartic acid as an amino acid was prepared and to this, as a solid, the cement (Portland cement for chemical analysis, Cement Association of Japan, 211R Reference Sample for chemical analysis) 2.40 g was added to prepare mixture aqueous solution. In the same manner as in Example 1, stirring was effected for 10 minutes to allow elution of calcium ions (elution step). Incidentally, in the above, the molar number of CaO in the cement and the molar number of the added L-aspartic acid=1:1.

During this elution step, the elution ratio of calcium ion (Ca elution ratio) was studied by measuring a pH value, an oxidization-reduction potential and a temperature of the mixture aqueous solution held in the reactor vessel 1 by the measuring instrument 7.

In succession to the above, solid residue in the mixture aqueous solution was removed by suction filtration, thereby to obtain filtrate. pH measurement of this filtrate showed pH of 2.77 (the isoelectric point of L-aspartic acid) to 3. Thus, to this filtrate, potassium hydrate was added as a pH adjusting agent to render the pH value to from 10 to 13.5 (pH adjusting step).

Then, to the above pH adjusted filtrate, a simulated combustion emission gas was introduced as an acid gas and bubbled therein to allow precipitation of calcium hydrate (precipitating step).

As the simulated combustion emission gas, a mixture gas of carbon dioxide gas ($CO_2$) and nitrogen ($N_2$) gas was employed. The simulated combustion emission gas was fed with the flow rates of the carbon dioxide gas and the nitrogen gas being adjusted respectively by the flow rate adjusters 4, 5 and being mixed by a predetermined mixture ratio by the mixer 6. In this example, the composition of the simulated combustion emission gas was 10 vol % $CO_2$+90 vol % $N_2$ and the simulated combustion emission gas was introduced at 1 liter/min for 90 minutes.

Then, the precipitated calcium carbonate was collected by suction filtration and filtrate (an amino acid-containing aqueous solution) was obtained (collecting step). The collected calcium carbonate was dried and measured for its weight, and the elution ratio of calcium ions (Ca elution ratio:the ratio of calcium in calcium carbonate relative to the amount of calcium ions eluted in the elution step) was observed.

In succession, to the obtained filtrate (amino acid-containing aqueous solution), 2.40 g of cement as a further solid was added again, and in the manner like the above, the series of the method of the elution step, the precipitating step and the collecting step were carried out for the second time. In this way, in the present example, to the same amino acid-containing aqueous solution, the series of the method of the elution step, the precipitating step and the collecting step were carried out in repetition for five times altogether.

Figure 13:
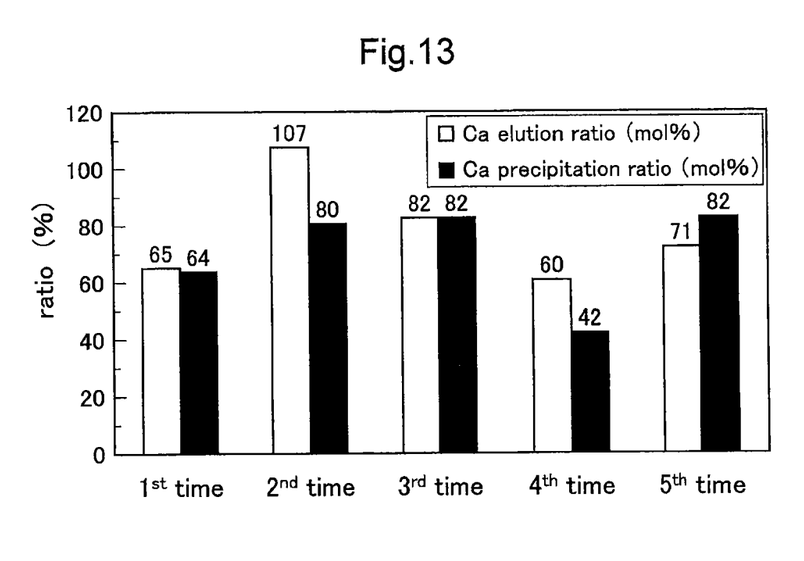
FIG. 13 is a graph showing elution ratios (mol %) of calcium ion and precipitation ratios (mol %) of when an amino-acid aqueous solution relating to Example 2 was used in repetition.

FIG. 13 shows results of elution ratios (Ca elution ratios) and precipitation ratios (Ca precipitation ratios) of each method cycle. As shown in FIG. 13, although some variances are present, even after use of the same amino acid-containing aqueous solution for at least five times in repetition, it was still possible to maintain elution ratios of 60% or higher.

INDUSTRIAL APPLICABILITY

The present invention is suitably used for collecting an alkali metal and/or an alkali earth metal from construction wastes containing concrete or industrial wastes such as steel slag.

REFERENCE SIGNS LIST

1 reactor vessel
2 stirrer
3 water bath tank
4, 5 flow rate adjusters
6 mixer
7 measuring instrument
8 gas chromatograph
9 backflow preventer
10 computer

The invention claimed is:

1. A method for extracting alkali metal and/or alkaline earth metal from a solid, the method comprising:
    a first eluting the alkali metal and/or the alkaline earth metal by adding the solid to an amino acid-containing aqueous solution containing aspartic acid, thereby eluting the alkali metal and/or the alkaline earth metal in the amino acid-containing aqueous solution;
    precipitating the alkali metal and/or alkaline earth metal by contacting the amino acid-containing aqueous solution after the first eluting with an acid gas to precipitate the alkali metal and/or alkaline earth metal as a salt;
    collecting the salt; and
    a second eluting the alkali metal and/or the alkaline earth metal by further adding a solid comprising the alkali metal and/or the alkaline earth metal to the amino acid-containing aqueous solution after the collecting to elute the alkali metal and/or the alkaline earth metal into the amino acid-containing aqueous solution,
    wherein the precipitating comprises adjusting the pH of the amino acid-containing aqueous solution by adding a pH adjusting agent to the amino acid-containing aqueous solution before or after contacting with the acid gas to increase a pH value of amino acid-containing aqueous solution to 7 or more.

2. The method of claim 1, wherein the alkali metal and/or alkaline earth metal comprises calcium.

3. The method of claim 1, wherein the alkali metal and/or alkaline earth metal comprises at least one alkali metal selected from the group consisting of lithium, sodium, potassium, rubidium and cesium.

4. The method of claim 1, wherein the alkali metal and/or alkaline earth metal comprises at least one alkaline earth metal selected from the group consisting of magnesium, strontium, barium and radium.

5. The method of claim 1, wherein the pH adjusting agent is NaOH or KOH.

6. The method of claim 1, wherein the salt is collected by filtration.

7. The method of claim 1, wherein the solid is a natural mineral.

8. The method of claim 1, wherein the solid is a waste product or a byproduct produced and discharged from a manufacturing method.

9. The method of claim 1, wherein the solid has a particle size of 1 μm to 100 μm.

10. The method of claim 1, wherein the amount of the amino acid is 0.01 times or more of the total number of moles of the alkali metal and the alkali earth metal contained in the solid.

11. The method of claim 1, wherein the acid gas comprises carbon dioxide.

12. The method of claim 1, wherein the acid gas is bubbled into the amino acid-containing aqueous solution.

13. The method of claim 1, wherein the first eluting is conducted at 10° C. to 70° C.

14. The method of claim 1, wherein the precipitating is conducted at 70° C. or lower.

15. The method of claim 1, further comprising:
    precipitating the alkali metal and/or alkaline earth metal by contacting the amino acid-containing aqueous solution after the second eluting with an acid gas to precipitate the alkali metal and/or alkaline earth metal as a salt; and
    collecting the salt.

16. The method of claim 15, further comprising a third eluting the alkali metal and/or the alkaline earth metal by further adding a solid comprising the alkali metal and/or the alkaline earth metal to the amino acid-containing aqueous solution after the collecting to elute the alkali metal and/or the alkaline earth metal into the amino acid-containing aqueous solution.

17. The method of claim 16, further comprising:
precipitating the alkali metal and/or alkaline earth metal by contacting the amino acid-containing aqueous solution after the third eluting with an acid gas to precipitate the alkali metal and/or alkaline earth metal as a salt; and
collecting the salt.

* * * * *